Sept. 18, 1934.  H. HERBERT  1,973,870

SPARK PLUG TESTER

Filed Oct. 10, 1933

INVENTOR
Harold Herbert
BY
Harry Radzinsky
ATTORNEY

Patented Sept. 18, 1934

1,973,870

UNITED STATES PATENT OFFICE 1,973,870

SPARK PLUG TESTER

Harold Herbert, New York, N. Y.

Application October 10, 1933, Serial No. 692,945

6 Claims. (Cl. 175—183)

This invention relates to a device for determining the efficiency in operation of spark plugs, magnetos and other high tension devices and particularly such devices as are associated with internal combustion engines, the testing taking place while the engine is in operation. While the improved testing device is applicable for use in connection with high tension devices other than spark plugs, it is particularly adaptable for measuring spark plug voltages and its operation for such purpose will be described.

The object of the invention is to provide a device which will test a spark plug under normal operating conditions and enable the user to ascertain whether his plug is in good condition and is operating with maximum efficiency. Tests have shown that voltage is dependent on the width of the gap between the electrodes of the plug, the pressure in the combustion chamber and temperature; the most important factor being the adjustment of the gap between the electrodes or "points" of the plug. The improved tester determines by a voltage reading whether the adjustment of the points is correct, and enables the user to properly set the spacing of the points to secure maximum operating efficiency from the plug.

The device consists of a method of reducing the high sparking voltage to a smaller and more easily read voltage by means of a capacity divider. Across the voltage to be measured is placed a small fixed capacity adapted to be placed in series with another condenser of larger capacity. The voltage will divide between the two capacities in series inversely as their capacities. The greater portion of the voltage drop will always be manifested across the smaller capacity which is consequently designed for high voltage service. In parallel with the low voltage high capacity is placed a neon tube of a known breakdown voltage. The method of operation of the device is as follows: An unknown voltage is placed across two capacities. If the neon tube is caused to flash by the unknown voltage, the larger capacity is gradually increased by a known amount to the point where the tube is extinguished. At this point the unknown voltage is equal to the ratio existing between the larger capacity divided by the effective capacity of the two condensers in series multiplied by the sparking voltage of the neon tube.

Figure 1:
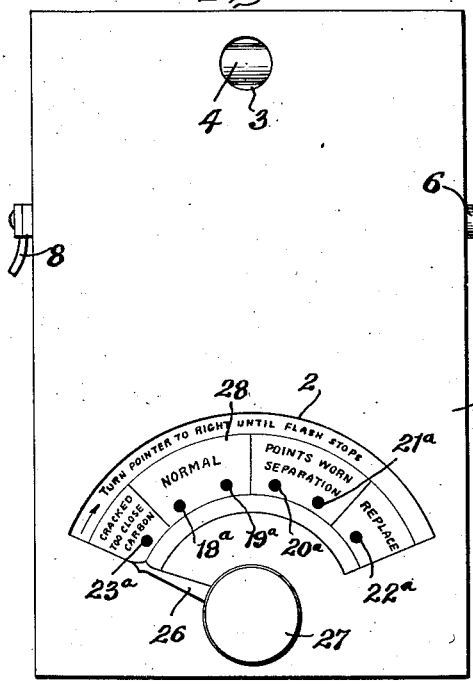
Figure 2:
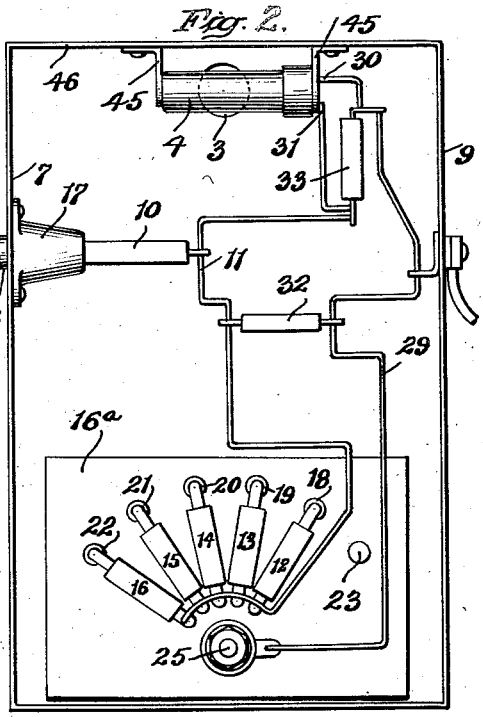
Figure 3:
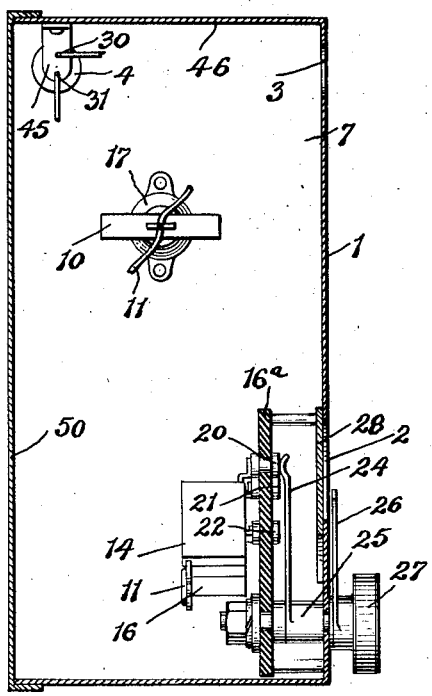
Figure 4:
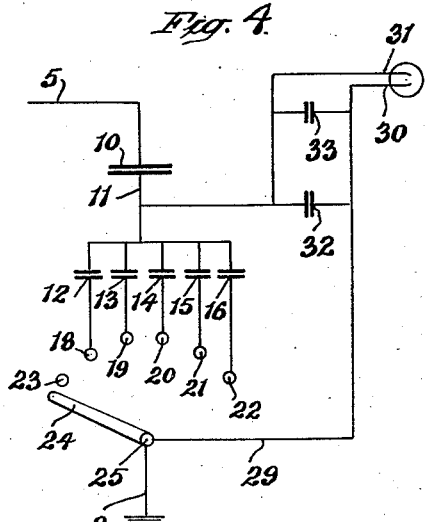

In the accompanying drawing, wherein the preferred embodiment of the invention is shown, Fig. 1 is a front elevation of the improved spark plug tester constructed in accordance with the invention; Fig. 2 is a rear view of the same with the rear cover of the box or casing removed to disclose the parts of the device; Fig. 3 is a vertical sectional view through the device; and Fig. 4 is a schematic diagram showing the wiring hook-up.

The parts of the device are contained within a casing, preferably of metal, having a front panel 1 provided with a segmental opening 2 near its lower end and a smaller aperture 3 near its upper end through which the sparking or flashing of a neon tube 4 located within the casing in back of the aperture 3 can be observed. The casing is normally closed by a removable back plate 50. Two leads extend from the device and are connected across the spark plug terminals. One of these leads is indicated at 5, the same being of insulated wire and it passes out of the casing through an insulating bushing 6 located in the side 7 of the casing. This lead 5 is connected to the high tension tip of the spark plug. The other lead 8 is grounded to the side 9 of the casing and has its opposite end connected to the engine frame.

The lead 5 connects to one side of a high-voltage, low-capacity fixed condenser 10 which is supported in an insulator 17 attached to the side 7 of the casing. The other side or plate of the condenser 10 is connected by a wire 11 to a series of low-voltage, high-capacity condensers indicated at 12, 13, 14, 15, 16 and 32. These condensers 12 to 16 inclusive are of succeedingly larger capacity. That is to say, condenser 13 is of larger capacity than condenser 12; condenser 14 is of larger capacity than condenser 13, and so on. These condensers are secured upon a sheet or plate 16a of insulating material located in the lower portion of the casing in back of the segmental opening 2 in the front of the casing.

The opposite end of each of the condensers 12 to 16 inclusive is connected to a fixed contact, that for the condenser 12 being shown at 18. Condenser 13 is connected to a similar contact shown at 19; condenser 14 is connected to contact 20, condenser 15 to contact 21 and condenser 16 to contact 22. The contact 23 is unconnected and serves to indicate a short circuit in the plug as will be explained hereafter. At 24 is shown a movable contact finger fixed upon a shaft 25 manually rotatable in the front panel 1 of the casing. The finger 24 is adapted to be brought to rest upon any one of the contacts 18 to 23 inclusive during the testing of the spark plug. For this purpose shaft 25 is provided with a knob 27 which is manually rotated to turn the shaft 25, and which carries a pointer adapted to be brought into alignment with any one of the dots 18a to 23a shown on the calibrated chart 28 positioned in and closing the opening 2 of the casing.

Each of the dots on the calibrated chart 28 indicates the presence of a contact behind it. That is to say, the dot 23a indicates that when the pointer 26 is in registration with it, the contact finger 24 is resting on the contact 23. Similarly dot 18a indicates the presence of contact 18 behind it; 19a indicating contact 19; 20a indicating contact 20; 21a indicating contact 21; and dot 22a indicating contact 22.

The movable contact finger 24 is connected by a wire 29 to one of the electrodes 30 of the neon tube 4 which is supported in brackets 45 from the top 46 of the casing. The wire 11 extending from the low voltage side of the high-voltage, low-capacity condenser 10 connects to the other electrode 31 of the neon tube. The condenser indicated at 33, and connected across the neon tube electrodes, is a by-pass condenser and may or may not be found necessary. As a precaution it might be used.

The operation of the device is as follows:

The lead 8 is connected to a grounded part of the engine and the lead 5 is connected to the high tension tip of the spark plug while the engine is in operation. The pointer 26 is first turned to the extreme left of the calibrated chart 28 or to the position shown in Fig. 1, and the knob 27 is then turned slightly until the pointer 26 rests over dot 23a, at which time the contact finger 24 will be resting on the unconnected contact 23. If at this time the Neon tube 4 is not flashing, which can be seen by looking through the aperture 3 in the casing front 1, this will serve as an indication to the operator that the plug is short circuited by carbon, by a cracked porcelain, or that the points or electrodes of the plug are entirely too close together. When the pointer is located on the contact 23, the only condenser in circuit with the neon tube, in addition to condenser 10, is the condenser 32. Consequently, at this position, a low voltage will flash the neon tube. As the pointer is moved to the succeeding contacts 18, 19, 20, 21 or 22 an increasingly greater voltage is required to flash the tube because of the increased capacity of each of the condensers 12 to 16 inclusive. If the neon tube is flashing when the pointer is on the dot 23a, the pointer is next turned to align with dot 18a which brings the finger contact 24 on the contact 18. If the plug is in good condition, the neon tube may discontinue flashing or may continue to spark or flash since the capacities of the condenser 12 and that indicated at 10 are such that if the electrodes of the plug are properly spaced and therefore the voltage between the electrodes of the plug is substantially correct, a cessation of flashing in the neon tube should occur. A certain variation is permissible however, and therefore if the tube is flashing, the pointer is next turned to align with the dot 19a to bring the contact finger 24 on the contact 19, where, if the plug is in good condition, the flashing will stop. If the flashing continues, the pointer 26 is next moved to align with dot 20a, bringing the contact finger on the contact 20. The capacity of the condenser 14 is such that if the neon tube stops flashing when the pointer reaches the dot 20a the plug needs a slight decrease in electrode separation and is therefore operating slightly inefficiently. If, however, the points or electrodes of the plug are far too widely spaced, the tube will continue to flash. The same is true of the contact 21. If the tube does not flash when the pointer 26 is moved to align with the dot 21a, this indicates that the points of the plug are badly worn or that there is too great a gap between them. If the plug is in a really bad condition, the neon tube will continue to flash when the pointer is turned to the dot 22a. In such case, the plug is in such bad condition that it needs to be replaced. By looking at the dial 28 clearly shown in Fig. 1, while he is rotating the knob 27, the user is able to easily determine the condition of the spark plug. If the flashing of the neon tube stops at either of the dots 18a and 19a, the plug is in good condition. If the flashing stops at dot 20a the plug is in poor condition. All that is required in operating the device is to note when flashing of the neon tube ceases and then note the position of the pointer 26 with respect to the dots on the dial. The spark voltage divides between the high-voltage, low-capacity condenser 10 and the individual large-capacity, low-voltage condensers 12 to 16 inclusive, inversely as to their capacity. Most of the voltage is across the high-voltage condenser 10 and a smaller definite portion of the voltage is across the selected one of the condensers 12 to 16, inclusive.

The formula for calibrating the spark voltage to be measured, is as follows:—

$$\text{Spark voltage} = \frac{\text{Larger capacity condenser (12 to 16 inclusive)}}{\text{Small capacity condenser (10)}} \times \text{Neon tube voltage}$$

Through the arrangement disclosed, the exact condition of the plug can be obtained during operating conditions, and it may be corrected accordingly, or a new plug substituted for the defective one.

What I claim is:

1. A spark plug tester comprising a high voltage, low capacity condenser, having one of its plates adapted for connection to a spark plug electrode, the second plate of said condenser being connected to an electrode of a neon tube and also to one of the plates of each of a series of higher capacity condensers, a movable contact for connection to the remaining plate of any one of the higher capacity condensers, and a connection between the movable contact and the second electrode of the neon tube.

2. A spark plug tester having a case, a neon tube mounted therein, a connection between one of the electrodes of said tube and one of the plates of a high voltage fixed condenser, said plate of said condenser being also connected to one of the plates of each of a series of low voltage, known-capacity condensers, and means for selectively connecting the second plate of any one of the low voltage condensers to the second electrode of the neon tube.

3. A device for determining spark plug voltages comprising, a neon tube, a condenser connected to one of the electrodes thereof, said condenser being also connected to a condenser bank, and means for selectively connecting any one of the condensers in the condenser bank with the second electrode of the neon tube.

4. A device for determining spark plug voltages comprising, a fixed capacity with a high break-down rating connected to one of the electrodes of a neon tube, a net-work of other capacitances connected in series with the first capacity and means for electrically connecting any one of the capacitances in the net-work with the second electrode of the neon tube.

5. A device for determining spark plug voltages comprising, a fixed capacity with a high break-down rating having one of its plates adapted for connection to a spark plug electrode, and its other plate connected in series with a network of capacitances and with one electrode of a neon tube, means for electrically connecting any one of the capacitances in the net-work with the second electrode of the neon tube, and a calibrated spark plug condition chart indicating plug conditions by voltages across the spark plug electrodes determinable by the connection of one of the capacitances in the net-work with the neon tube electrode during sparking of the plug.

6. A device for determining spark plug voltages comprising, a grounded lead and a second lead for attachment to a spark plug electrode, a low capacity, high voltage fixed condenser having one of its plates connected to the second lead and having its other plate connected to one of the electrodes of a neon tube and also to one of the plates of each of a series of high capacity fixed condensers, the grounded lead being connected to the second electrode of the neon tube and also to a movable contact means for electrically connecting the grounded lead with the second plate of any one of the high capacity fixed condensers.

HAROLD HERBERT.